United States Patent [19]

Suga et al.

[11] Patent Number: 4,800,376
[45] Date of Patent: Jan. 24, 1989

[54] MULTIPLE DISPLAY SYSTEM

[75] Inventors: Ryoichi Suga; Yutaka Nakagawa; Yoshimi Watanabe, all of Kanagawa, Japan

[73] Assignee: Sony Corporation, Tokyo, Japan

[21] Appl. No.: 945,797

[22] Filed: Dec. 23, 1986

[30] Foreign Application Priority Data

Jan. 13, 1986 [JP] Japan ................................ 61-4760

[51] Int. Cl.$^4$ .............................................. G09G 1/00
[52] U.S. Cl. .................................... 340/721; 340/716; 340/752; 340/717; 358/56; 358/87; 358/241
[58] Field of Search ............... 340/791, 789, 717, 721, 340/825.05, 752, , 799; 358/122, 123, 124, 87, 56, 241

[56] References Cited

U.S. PATENT DOCUMENTS

| 4,112,423 | 9/1978 | Bertolasi | 358/87 |
| 4,635,105 | 1/1987 | Farreau | 358/56 |
| 4,682,239 | 7/1987 | Watanabe | 358/241 |
| 4,694,293 | 9/1987 | Sugiyama et al. | 340/825.05 |

FOREIGN PATENT DOCUMENTS

| 0074696 | 3/1983 | European Pat. Off. . |
| 3222266 | 12/1983 | Fed. Rep. of Germany . |
| 2092346 | 8/1982 | United Kingdom . |
| 2123656 | 2/1984 | United Kingdom | 340/721 |
| 2148077 | 5/1985 | United Kingdom | 340/717 |

OTHER PUBLICATIONS

Funkschau 14/1982, Heinz W. Krammer, Mit 30 720 Elektronenstrahlrohren: Grob-Garbbildschirm.

Primary Examiner—Gerald L. Brigance
Attorney, Agent, or Firm—Lewis H. Eslinger; Jay H. Maioli; Donald S. Dowden

[57] ABSTRACT

A multiple display system is adapted to display data in the VIDEOTEX standard on a display formed of a plurality of display devices. The system comprises an encoder for generating a code on the basis of internal or external data supplied thereto, a plurality of decoders, each of which includes a central processing unit, successively arranged in series with respect to the encoder, and a plurality of display devices provided respectively corresponding to the plurality of decoders to thereby display a large image by the plurality of display devices. The encoder inserts an identification number in a predetermined portion of a data sequence. The plurality of decoders respectively select data with corresponding identification number, convert the selected data into a video signal, and supply respective display devices with the video signal.

5 Claims, 10 Drawing Sheets

MULTIPLE DISPLAY SYSTEM

BACKGROUND OF THE INVENTION

1. Field of the Invention

This invention relates generally to a multiple display system, and more particularly to such a multiple display system for displaying a VIDEOTEX information.

2. Description of the Prior Art

Recently, a multi-screen system is often used in department stores, shopping centers, concourses in stations, sites for exhibition and so on, to attract many people. The multi-screen system for this purpose is generally constructed such that a digitizer, a plurality of VTRs, video disk players and so on are used to fetch a single analog video signal, convert the analog signal into a digital signal, convert again the digital signal into a plurality of analog video signals, to thereby supply the analog video signal to a plurality of displays, respectively.

However, the above-mentioned prior art system requires plurality of VTRs and video disk players and particularly an expensive digitizer so that the production cost thereof is high. Further, when the information displayed on the screen of the displayer is to be renewed or changed, new information must be newly recorded by a video tape recorder, edited, processed and so on so that it takes much time for preparation.

On the other hand, the recently spreading VIDEOTEX system has its video information standard unified by the VIDEOTEX protocol. Thus, it is easy to obtain a number of or variety of video information. Then, if the information is displayed by the multi-screen system, it is possible to attract many people.

However, the video signal used in the VIDEOTEX system is a coded signal which cannot be so easily edited as the above-mentioned analog video signal.

Further, in the multi-screen system, the original video signal is required to be divided into the same number as that of display devices, which results in a complicated construction of the system.

Further, if an enlarged picture is produced by a plurality of display devices, discrepancies occur at the edges between adjacent display devices, so that the resulting displayed picture becomes apt to be one with parts unnaturally linked. Furthermore, it is difficult to display a plurality of pictures in synchronism with each other. Particularly in the case where blinkings occur over a plurality of display areas, it is more difficult to establish the synchronization among the blinkings.

Also, let be assumed that video information is divided as above at a control center and the video signals so divided are transmitted to respective terminal devices, each of which is connected to each of the display devices. If in this case, a plurality of the terminal devices are connected in parallel with one another to the control center, it is required to provide each of the terminal devices with a transmission port and prepare transmission lines to connect the control center with each of the terminal devices, which results in complicated control program and circuit construction and also the high production cost.

OBJECTS AND SUMMARY OF THE INVENTION

Accordingly, it is an object of the present invention to provide an improved multiple display system.

It is another object of the present invention to provide a multiple display system which removes the defect encountered in the prior art.

It is also an object of the present invention to provide a multiple display system in which a plurality of decoding means are arranged in series with respect to an encoder means which generates information on the basis of internal or external data, and a plurality of display devices are provided corresponding to the plurality of decoding means, to thereby display a single large image over all of the display devices.

It is further an object of the present invention to provide a multiple display system in which a plurality of terminals are serially connected to encoder means, an identification number is inserted in a predetermined portion of a data sequence generated by the encoder means, the most forward terminal of a plurality of serially connected terminals is initially set when it receives, an identification number from the encoder means, and produces and transmits a new identification number for the next terminal, while the next terminal is initially set when it receives the new identification number, produces and transmits a new identification number for the following terminal, and the same operation is repeated until the last terminal, whereby each of the plurality of serially connected terminals can be assigned with an identification number to be initially set by substantially using one transmission line.

It is further an object of the present invention to provide a multiple display system which is intended to simplify a control program executed by the encoder means to control a plurality of the terminals and the circuit configuration by serially connecting the encoder means with the plurality of terminals, generating a transmission stop signal and supplying the same to the forward terminal when the next terminal overflows with data, in at least the plurality of decoding means.

It is further an object of the present invention to provide a multiple display system which is capable of displaying a plurality of images in synchronism with one another by supplying a synchronizing control signal from the encoder means which generates information on the basis of internal or external data to the plurality of decoding means serially arranged with respect to the encoder means, to thereby synchronize the signal processing effected by each of the decoding means.

It is further an object of the present invention to provide a multiple display system in which the encoder means which generates information on the basis of internal or external data, converts the coordinates of the original data into the data of predetermined enlarged coordinates corresponding to the plurality of serially arranged decoding means, then encodes the converted data, and supplies the data of the encoded enlarged coordinates to the plurality of decoding means respectively to thereby display an image in an enlarged scale on the corresponding display devices easily.

It is a yet further object of the present invention to provide a multiple display system in which the encoder means, which generates information on the basis of internal or external data, calculates the coordinates of a certain point from which enlarged coordinates are calculated corresponding to a plurality of decoders arranged in series, and the enlarged coordinates are shifted by a predetermined amount in the direction of the origin on the display devices corresponding to the decoding means, to thereby substantially compensate for a portion of image which is hidden by the bezel of the two adjacent display devices and maintain the linearity of the image displayed on two adjacent display devices.

According to one aspect of the present invention, there is provided a multiple display system adapted to display data in a VIDEOTEX standard on a display formed of a plurality of display devices as a single picture screen, the multiple display system comprising: encoder means for generating a code on the basis of internal or external data supplied thereto; a plurality of decoding means successively arranged in series with respect to the encoder means; a plurality of display devices provided respectively corresponding to the plurality of decoding means; and means for setting an identification number to each of the plurality of decoding means, wherein the encoder means inserts an identification number in a predetermined portion of a data sequence, the plurality of decoding means respectively extract data with corresponding identification numbers from the data sequence supplied thereto, convert the extracted data into video signals, and supply the display devices with the video signals.

The above and other objects, features and advantages of the present invention will become apparent from the following detailed description of the preferred embodiment taken in conjunction with the accompanying drawings, throughout which like reference numerals designate like elements and parts.

DESCRIPTION OF THE PREFERRED EMBODIMENT

Now, an embodiment of a multiple display system according to the invention will hereinafter be described with reference to FIGS. 1 to 15.

Figure 1:
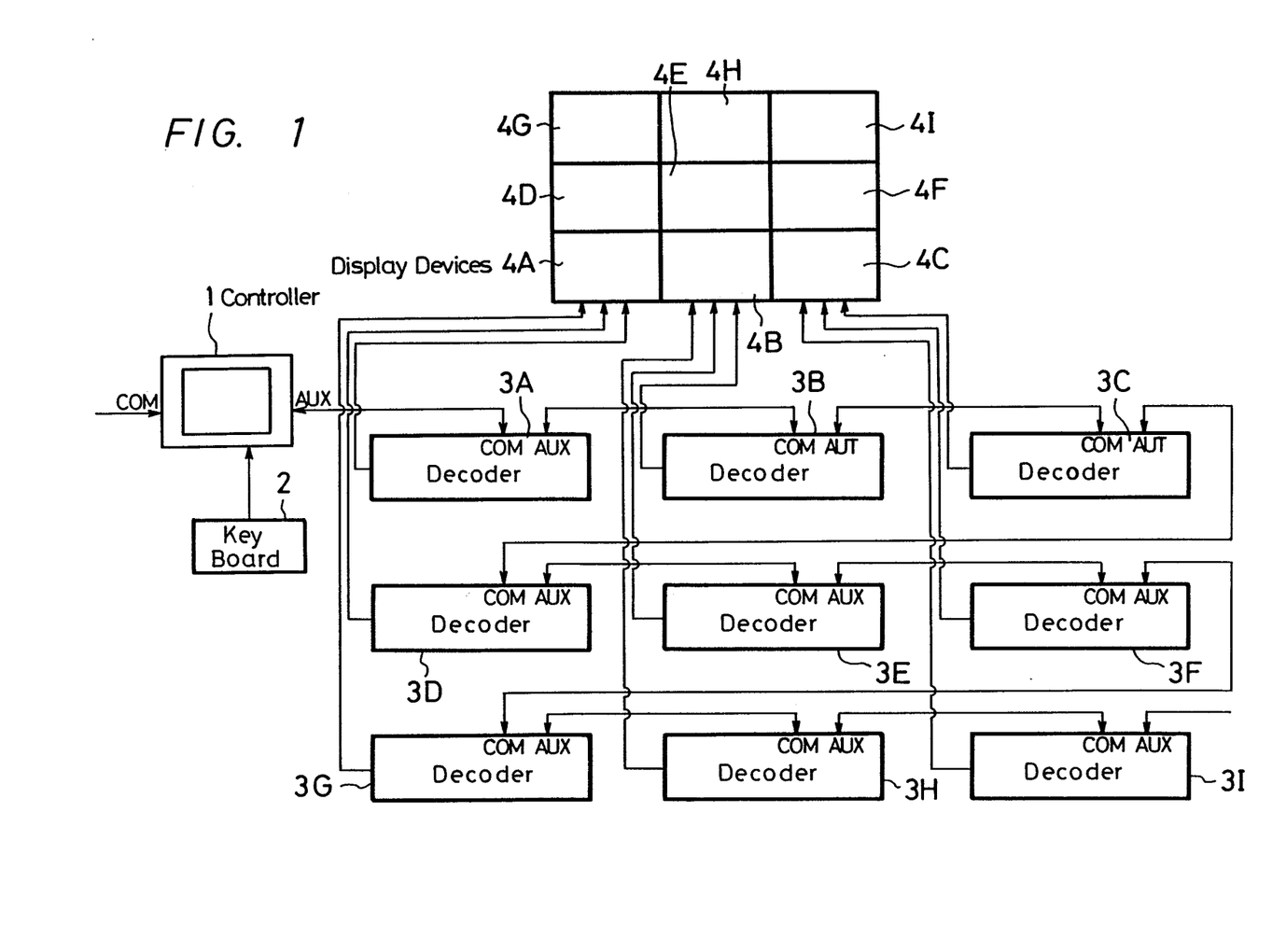
FIG. 1 is a schematic block diagram showing a construction of an embodiment of the present invention.

FIG. 1 shows a whole arrangement of an embodiment of the multiple display system according to the invention. In FIG. 1, reference numeral 1 designates a controller or information generating means for generating information on the basis of data internally or externally supplied thereto which includes a keyboard 2 connected thereto and a printer and so on though not shown. The controller 1 has a communication (hereinafter simply referred to as a "COM") port and an auxiliary (hereinafter simply referred to as an "AUX") port. The controller 1 receives the internal and/or external information data through the COM port, carries out the processing thereof, and then transmits the same through the AUX port.

A plurality of decoders, for example, nine decoders 3A to 3I are arranged in series with respect to the controller 1, each of which has a COM port and an AUX port. The COM port of the decoder 3A is connected with the AUX port of the controller 1, and the AUX port of the decoder 3A with the COM port of the decoder 3B. The AUX port of the decoder 3B is connected with the COM port of the decoder 3C, and the AUX port of the decoder 3C with the COM port of the decoder 3D. The rest of the decoders are connected in the same manner as mentioned above. Therefore, the controller 1 and the decoders 3A to 3I are substantially connected in series in this order and the data can be bi-directionally transmitted through the respective COM and AUX ports.

Provided with the respective decoders 3A to 3I are display devices 4A to 4I which are respectively supplied with output signals from the decoder 3A to 3I. In this case, display devices ($3 \times 3 = 9$) are used as an example of a picture screens ($m \times n$).

Figure 2:
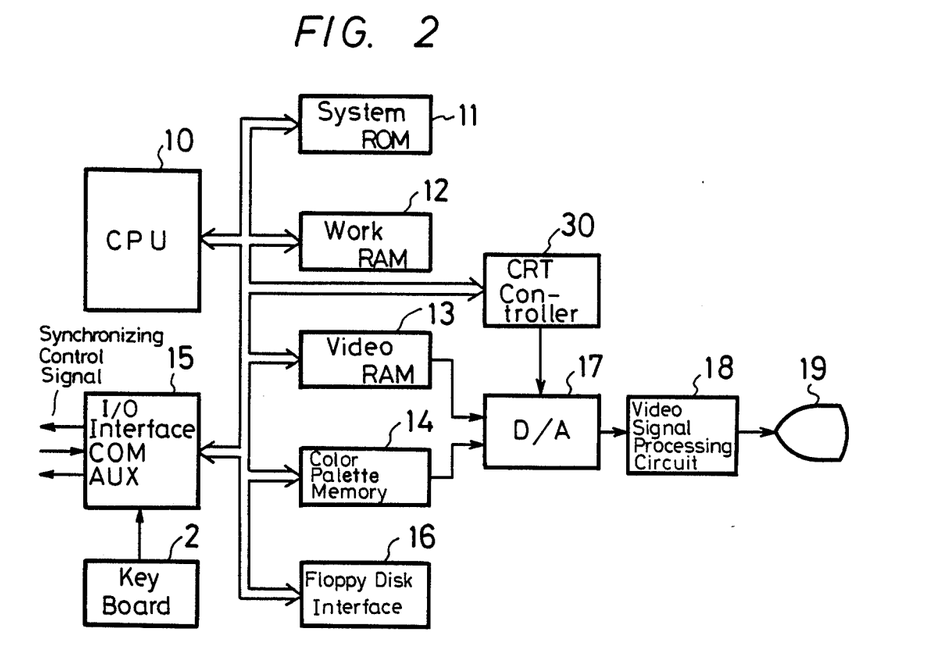
FIG. 2 is a block diagram showing a construction of a controller appearing in FIG. 1.

As the controller 1, there may be considered such as constructed e.g. as shown in FIG. 2. In FIG. 2, reference numeral 10 designates a central processing unit (hereinafter simply referred to as a "CPU") which is provided with a system ROM 11, a work RAM 12, a video RAM 13, a color palette memory 14, an I/O (input/output) interface 15 and a floppy disk interface 16. The I/O interface 15 is provided with the above-mentioned COM port and AUX port and generates a synchronizing control signal to establish the synchronization among the respective decoders 3A to 3I, as will be described later.

Arranged in the output sides of the video RAM 13 and the color palette memory 14, both for display, is a D/A converter 17. Further provided with the CPU 10 is a CRT controller 30 which supplies the D/A converter with a picture drawing instruction on the basis of a picture drawing command outputted from the CPU 10. The analog signal converted from the digital signal by the D/A converter 17 is processed by a video signal processing circuit 18 to be transformed into R, G, and B chromatic or color signals which are then supplied to a display device 19. Incidentally, each pixel or picture element on the screen of the display device 19 corresponds one by one to the address in the video RAM 13.

Figure 3:
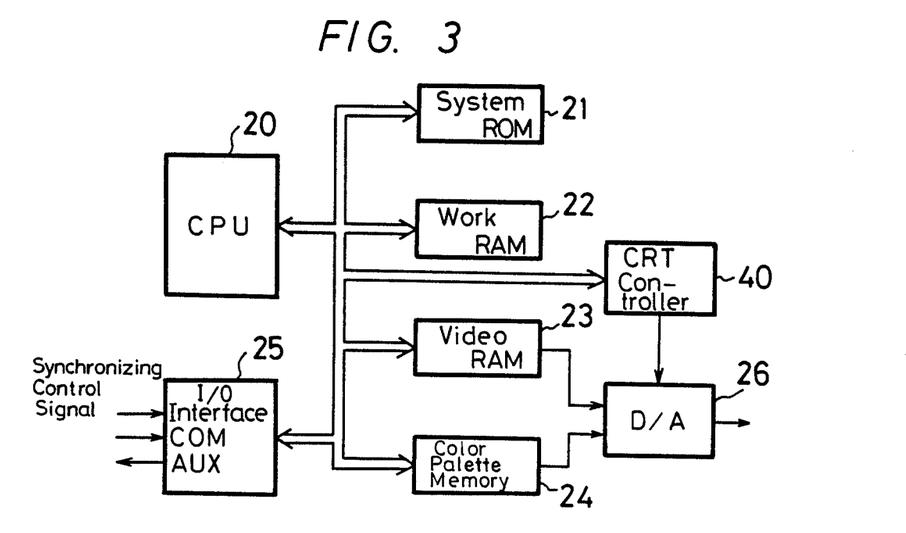
FIG. 3 is a block diagram showing a construction of a decoder appearing in FIG. 1.

As each of the decoders 3A to 3I, there may be considered such one as constructed e.g. as shown in FIG. 3. In FIG. 3, reference numeral 20 is a CPU which is provided with a system ROM 21, a work RAM 22, a video RAM 23, a color palette memory 24, and an I/O interface 25. The I/O interface 25 is provided with the aforementioned COM port and AUX port and supplied with the aforementioned synchronizing control signal.

Arranged at the output sides of the video RAM 23 and the color palette memory 24, both for display, is a D/A converter 26. Further provided with the CPU 20 is a CRT controller 40 which supplies the D/A converter 26 with a picture drawing instruction on the basis of a picture drawing command outputted from the CPU 20. The analog signal converted from the digital signal by the D/A converter 26 is processed by a video signal processing circuit, not shown, to be transformed into R, G, and B color signals which are supplied to one of the display devices 4A to 4I corresponding to the decoder. In other words, the decoder may be constructed in the same manner as the controller 1, except that the decoder does not comprise the floppy disk interface and the display device. It goes without saying that a keyboard, a printer and so on may be provided with the I/O interface 25.

Figure 4:
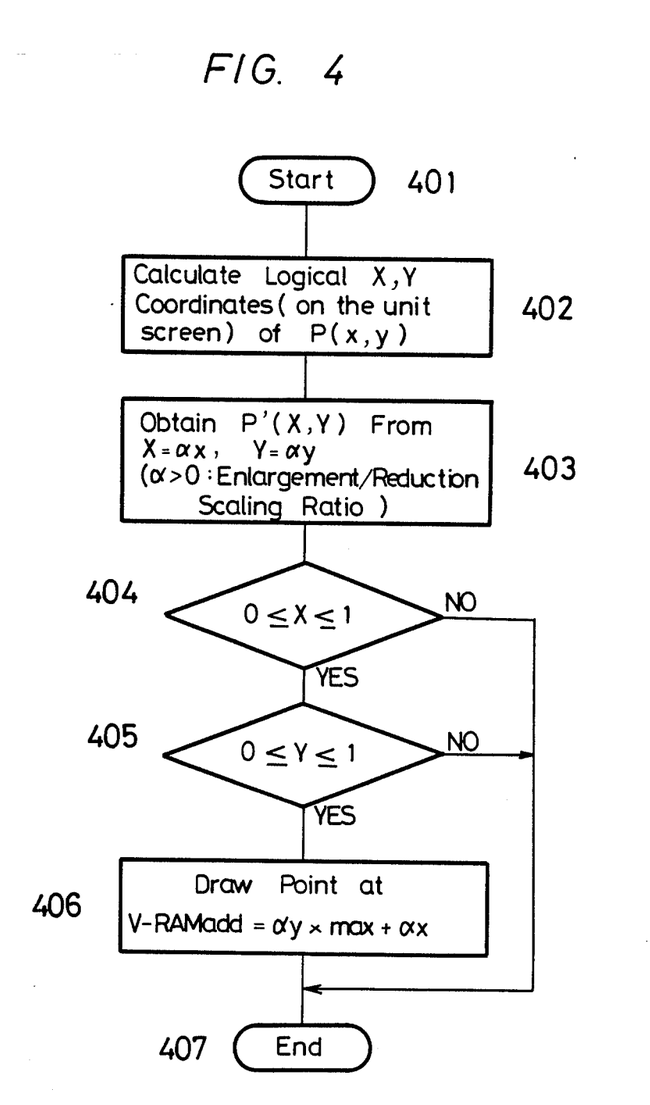
FIGS. 4, and 5A and 5B are, respectively, a flow chart and a diagram used to explain how an enlargement or reduction of an image is effected.
Figure 5A:
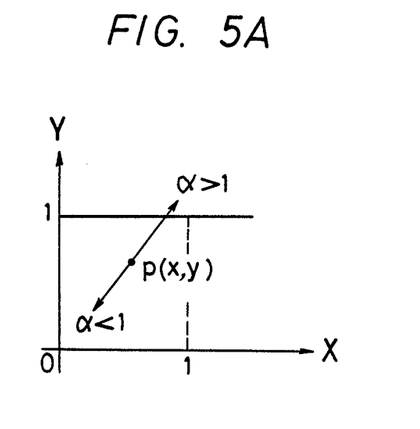

Next, the function of enlargement or reduction of a picture will be hereinafter described with reference to FIGS. 4 and 5. First, the procedure of this function is explained, referring to FIG. 4. When an enlargement or reduction program is started at step 401, the CPU 10 reads out a picture drawing command written on a disk, not shown, in the form of a bit sequence, through the floppy disk interface 16 and stores the picture drawing command in the work RAM 12. Then, at step 402, the CPU 10 analyzes the operand of the picture drawing command, calculates logical X - Y coordinates (on the unit screen), and obtains coordinates of a certain point P (x, y) on the screen, as shown in FIG. 5A. Next, at step 403, the coordinates of point P (x, y) are multiplied by $\alpha$ ($\alpha$ represents an enlarging or reducing scaling ratio being $\alpha \geq 0$) to obtain a point P'(X, Y) in the enlarged or reduced coordinates by X=$\alpha$x and Y=$\alpha$y. The program then proceeds to step 404 whereat it is judged whether or not the value X obtained at step 403 satisfies $0 \leq X \leq 1$. If the answer at step 404 is no, the program proceeds to step 407 to be terminated, since the picture drawing cannot be effected unless X satisfies the above condition, $0 \leq X \leq 1$. On the other hand, if the answer at step 404 is yes ($0 \leq X \leq 1$ is satisfied), the program proceeds to step 405 whereat it is judged whether or not the value Y obtained at step 403 satisfies $0 \leq Y \leq 1$. If the answer at step 405 is no, the program proceeds to step 407 to be terminated, since the picture drawing cannot be effected unless Y satisfies the above condition, $0 \leq Y \leq 1$. If the answer at step 405 is yes ($0 \leq Y \leq 1$ is satisfied), then the program proceeds to step 406 wherein the values of the coordinates of the point P are stored at a predetermined address in the video RAM 13. An address V-RAMadd at a predetermined position in the video RAM 13 is determined by the following equation as shown in FIG. 5B.

$$V-RAMadd = \alpha_y X_{max} + \alpha_x$$

Figure 5B:
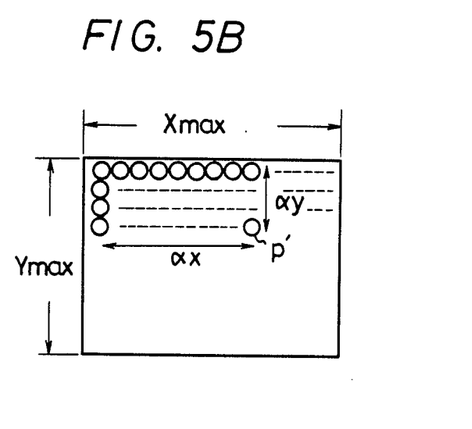

FIG. 5B shows the screen of the display device 19, each pixel of which corresponds to each address in the video RAM 13. $X_{max}$ and $Y_{max}$ respectively represent, for example, 256 and 200 pixels. The point P of the enlarged or reduced coordinates is drawn at the point P' expressed by ($\alpha$x, $\alpha$y) in FIG. 5B.

The information indicative of the enlarged or reduced coordinates thus stored in the video RAM 13 is read out therefrom under the control of the CRT controller 30. The information is added with the information representative of the intensity of color generated by the color palette memory 14, converted into analog signals by the D/A converter 17, supplied to the video signal processing circuit 18 to be transformed into R, G, and B color signals, and then displayed on the screen of the display device 19.

The information indicative of enlargement or reduction information read from the video RAM 13 is added with an ID (identification) number corresponding to each of the decoders, and then supplied to the decoders 3A to 3I through the AUX port of the I/O interface 15. Each of the decoders 3A to 3I fetches the information having the ID number corresponding thereto, decodes the information, and supplies the decoded information to the corresponding one of the display devices 4A to 4I to display the information on the screen of the corresponding display device. In this way, it is possible to display a large single image or picture by using all the display devices 4A to 4I if information supplied to the decoders 3A to 3I is enlargement information. And also the same single image can be displayed on each of the display devices 4A to 4I if information: supplied to the decoders 3A to 3I is reduction information. It will be understood that there is no limitation on display manners. Therefore, it is possible to display a medium sized image by simultaneously using e.g. the display devices 4A, 4B, 4D, and 4E and the same image is displayed by each of the other display devices, i.e. a combination of the medium sized image and the small images. It is also possible that a small image is inserted after a large single image is displayed by using all the display devices.

It is further possible that while a large single image is displayed on the display devices 4A to 4I, a single image is monitored by the display device 19 arranged in the controller 1.

Figure 6:
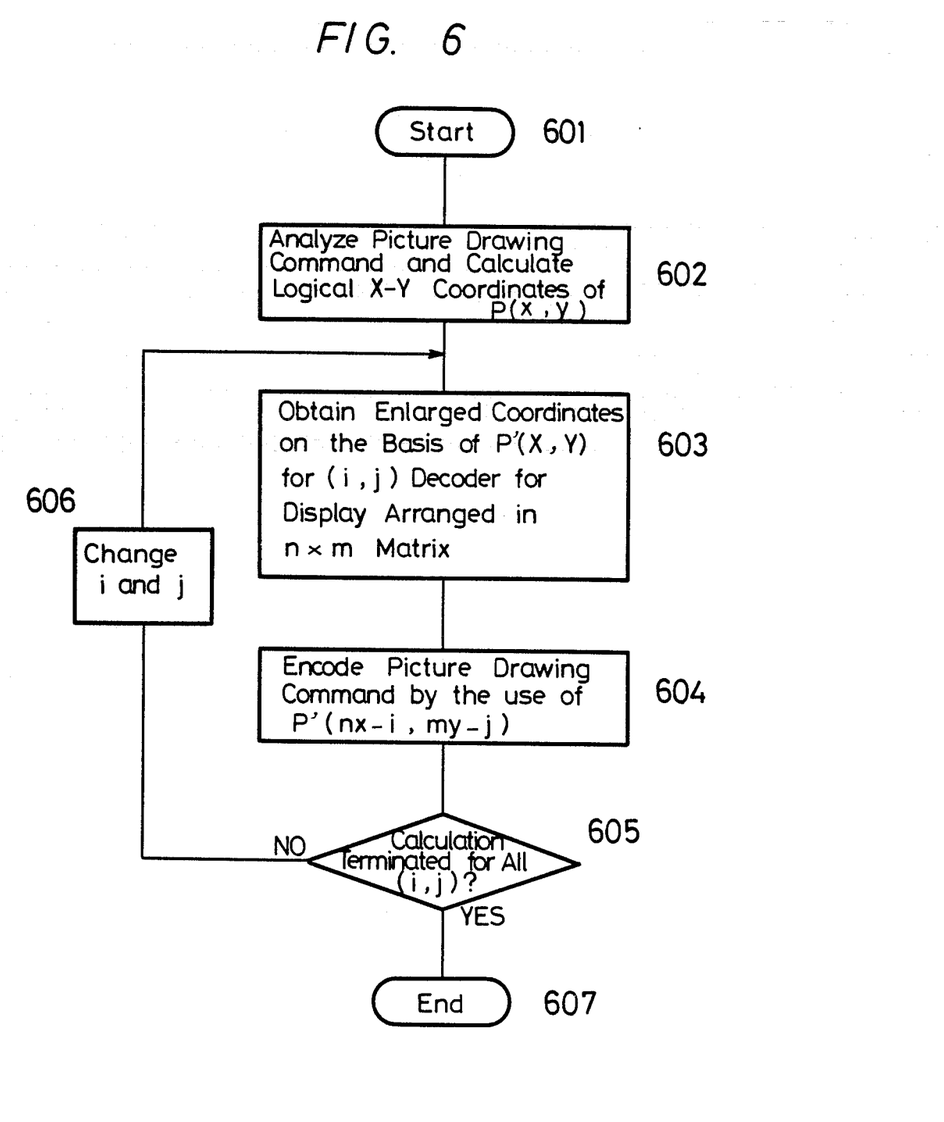
FIGS. 6 and 7 are respectively a flow chart and a diagram used to explain how a data conversion for enlargement of an image is effected.
Figure 7:
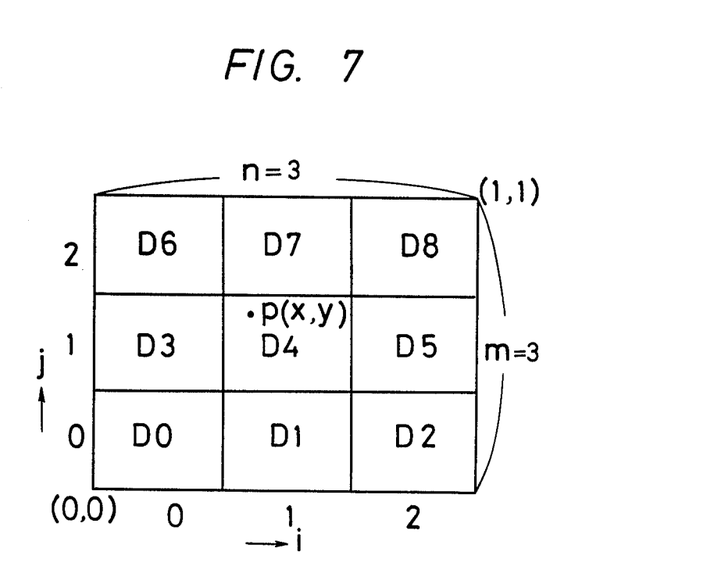

A manner for converting an original data to data for an enlarged display in response to each decoder will be hereinafter explained with reference to FIGS. 6 and 7. The data conversion program is started at step 601, whereat a picture drawing command written on the floppy-disk in the form of a bit sequence is read out by the CPU 10 through the floppy disk interface 16 and stored in the work RAM 12. Then, the CPU 10 analyzes the operand of the picture drawing command, calculates logical X - Y coordinates, and obtains values of a point P (x, y) on the X - Y coordinates at step 602. Next, at step 603, enlarged coordinates are obtained on the basis of a point P'(nx−i, my−j), wherein the coordinates are those of a (i, j) decoder for one of display devices arranged in n (in the horizontal or row direction)×m (in the vertical or column direction) matrix. The value i ranges from 0 to n−1, and the value j from 0 to m−1. At step 604, the picture drawing command is encoded by the use of P'(nx−i, my−j). That is, the enlarged X - Y coordinates are generated as an ordinary picture drawing command, so that it is not necessary that the decoders are operated without consideration of the enlargement. An enlarged display can be obtained if the decoders are normally operated.

Next, at step 605, it is judged whether or not the calculation is made for all the (i, j), that is, whether or not data to be supplied to all the decoders are converted to data for enlarged display. If the answer is no, the program proceeds to step 606 wherein the values i and j are changed and then, the above described procedure from step 603 to step 604 is repeated. If the answer at step 605 is yes, that is, when the calculation is made for all the (i, j), the program proceeds to step 607 to be terminated.

Let it now be assumed that data is converted for the case where an image is to be enlarged 3 times with the values m and n both being 3. Referring to FIG. 7, reference numerals D0 to D8 correspond to the decoders 3A to 3I. The values i and j respectively represent units of maximum number of pixels in the horizontal and vertical directions. For example, a unit of the maximum number of pixels in the horizontal direction may consists of 256 pixels, and that in the vertical direction 200 pixels. These values range from 0 to 2, respectively.

Therefore, the decoder corresponding to D0 is represented by (0, 0); the decoder corresponding to D1 by (1, 0); the decoder corresponding to D2 by (2, 0); the decoder corresponding to D3 by (0, 1); the decoder corresponding to D4 by (1, 1); the decoder corresponding to D5 by (2, 1); the decoder corresponding to D6 by (0, 2); the decoder corresponding to D7 by (1, 2); and the decoder corresponding to D8 by (2, 2). The coordinates of the original data P (x, y) are converted to P'(nx−i, my−j) for the respective decoders as follows:

Decoder corresponding to D0 ... P'(3x, 3y)
Decoder corresponding to D1 ... P'(3x−1, 3y)
Decoder corresponding to D2 ... P'(3x−2, 3y)
Decoder corresponding to D3 ... P'(3x, 3y−1)
Decoder corresponding to D4 ... P'(3x−1, 3y−1)
Decoder corresponding to D5 ... P'(3x−2, 3y−1)
Decoder corresponding to D6 ... P'(3x, 3y−2)
Decoder corresponding to D7 ... P'(3x−1, 3y−2)
Decoder corresponding to D8 ... P'(3x−2, 3y−2)

Therefore, the command for drawing a line from a point $(x_1, y_1)$ to a point $(x_2, y_2)$ corresponds to those for drawing a line from a point $(3x_1, 3y_1)$ to a point $(3x_2, 3y_2)$ for the decoder corresponding to D0; a line from a point $(3x_1-1, 3y)$ to a point $(3x_2-1, 3y_2)$ for the decoder corresponding to D1;

.
.
.

a line from a point $(3x_1-2, 3y_1-2)$ to a point $(3x_2-2, 3y_2-2)$ for the decoder corresponding to D8. The relationship between the ID number and the decoder (i, j) is expressed by $ID=jn+i$. For example, the ID number of the decoder (0, 0) is 0, that of the decoder (1, 0) is 1, ... and that of the decoder (2,2) is 8.

When an image is to be displayed on a plurality of display devices, bezels of the display devices pose a problem. It is desirable that even if there are bezels, an image can be displayed on a plurality of the display devices as if there are no bezels, that is, the bezels are not conspicuous. When a single image is displayed over a plurality of display devices, discrepancies or steps inevitably occur at bezels between adjacent display devices. Therefore, the image, as a whole, is unnaturally displayed.

Figure 8:
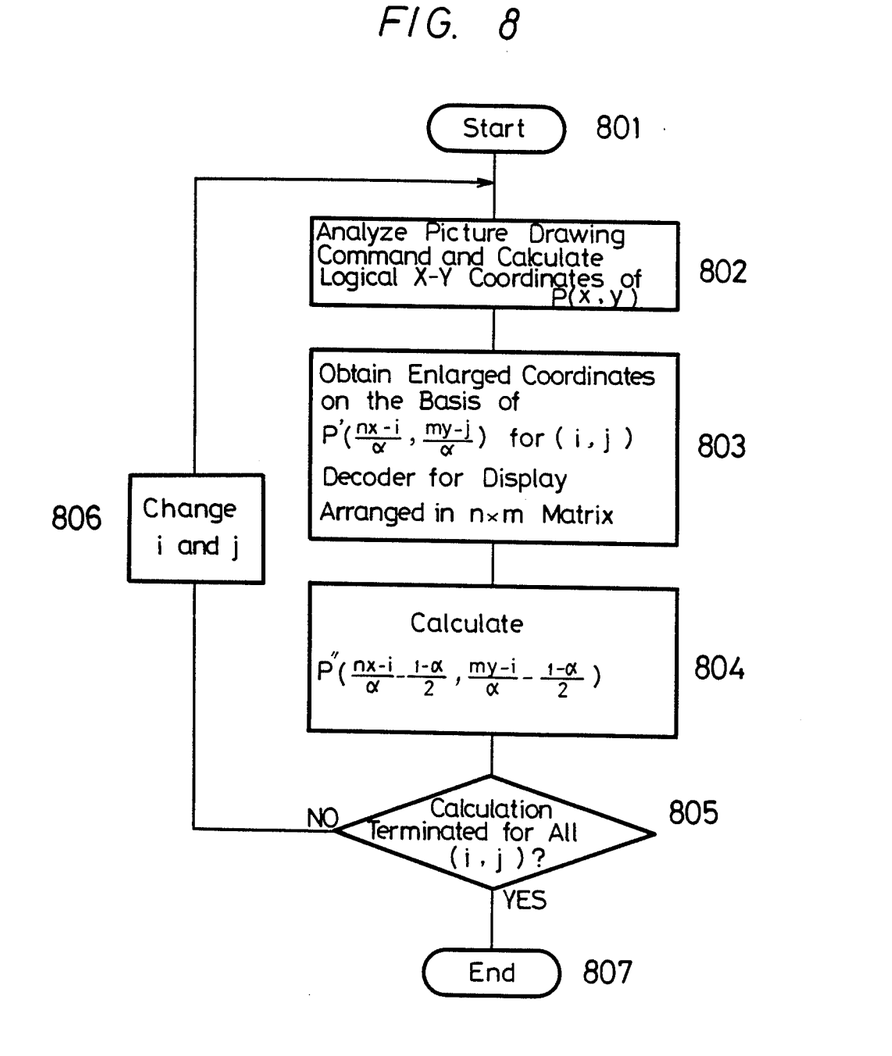
FIGS. 8, and 9A and 9B are, respectively, a flow chart and a diagram used for explaining how a bezel correction is effected.
Figure 9A:
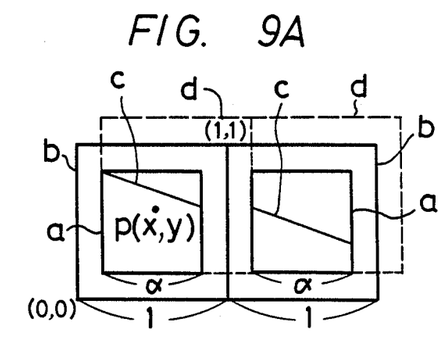
Figure 9B:
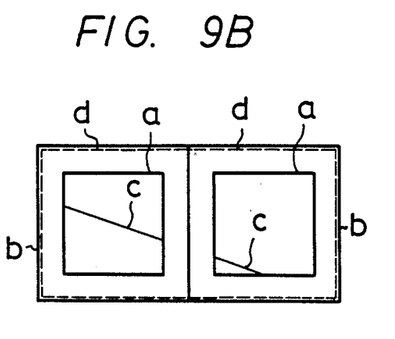

A method to solve or remove this problem will now be explained with reference to FIGS. 8 and 9. The bezel correction program is started at step 801, whereat certain coordinates written on the disk in the form of a bit sequence are read by the CPU 10 through the floppy disk interface 16 and stored in the work RAM 12. The CPU 10 analyzes the picture drawing command, calculates the logical X - Y coordinates, and obtains the coordinates of a point P (x, y) at step 802. Next, at step 803, the enlarged X - Y coordinates of a point P'(nx−i/α, my−j/α) are calculated, where a display ratio satisfies $0 \leq \alpha \leq 1$. The X - Y coordinates are data for a decoder (i, j) corresponding to one of the display devices formed into an n×m matrix. Then, the coordinates obtained at step 803 are shifted by 1−α/2 in the direction of the origin to obtain coordinates P''(nx−i/α−1−α/2, my−j/α−1−α/2) at step 804.

Next, at step 805 it is judged whether or not the calculation is made for all the (i, j), that is, whether or not the shifted coordinates P'' as mentioned above are calculated for all the decoders. If the answer at step 805 is no, the program proceeds to step 806 wherein the values of i and j are changed. Then, the procedure from step 802 to step 804 is repeated. On the other hand, if the answer at step 805 is yes (the above calculation is carried out for all the (i, j)), the program proceeds to step 807 to be terminated.

In relation to the operation shown in FIG. 8, how the bezel correction is effected when an image is displayed over e.g. two adjacent display devices is explained with reference to FIGS. 9A and 9B. In FIGS. 9A and 9B, reference numeral a designates a physical display area of a display device, b a frame including a border and bezel portions, and c a line drawn over two adjacent display devices. When the X - Y coordinates of the point P (x, y) is obtained at step 802 in FIG. 8, the point P (x, y) is displayed in the display area a of a certain display device. The point P' on the enlarged X - Y coordinates obtained at step 803 in FIG. 8, though not shown, is displayed in a virtual enlarged display area expressed by a broken line d in FIG. 9A. Then, the virtual enlarged display area is shifted by 1−α/2 in the direction to the origin (0, 0), as shown in FIG. 9B. The coordinates at that time are those obtained at step 804 in FIG. 8. As will be clear from FIG. 9B, the virtual display area d and the actual display area b substantially overlap with each other. In the corrected display, i.e. in FIG. 9B, the line c is displayed in a lower portion than that in FIG. 9A. However, the line c in the left display area a and that in the right display area a maintain linearity, that is, the discrepancy or step between the two adjacent display areas by the frames thereof can be prevented.

Figure 10:
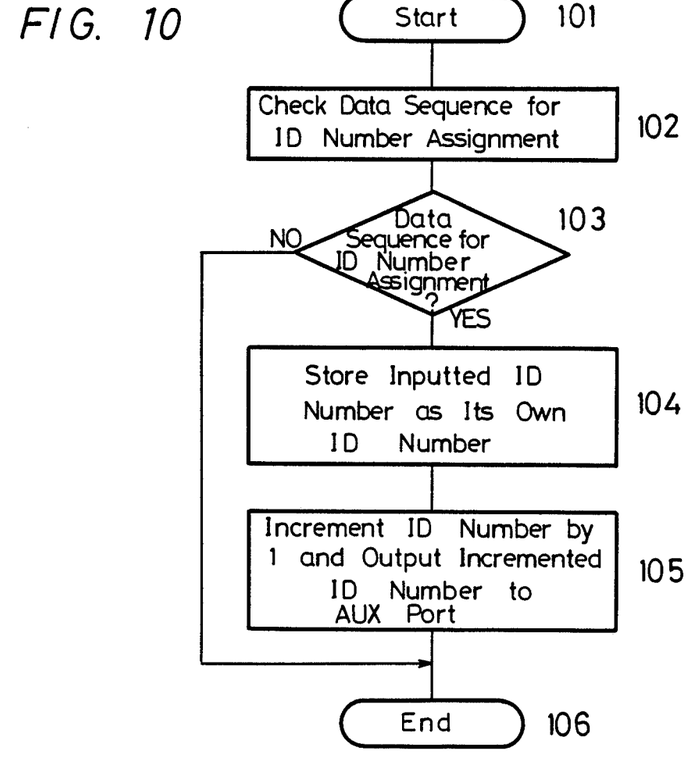
FIGS. 10 and 11 are respectively a flow chart and a diagram employed for explaining how an ID number is assigned to a data sequence.
Figure 11:
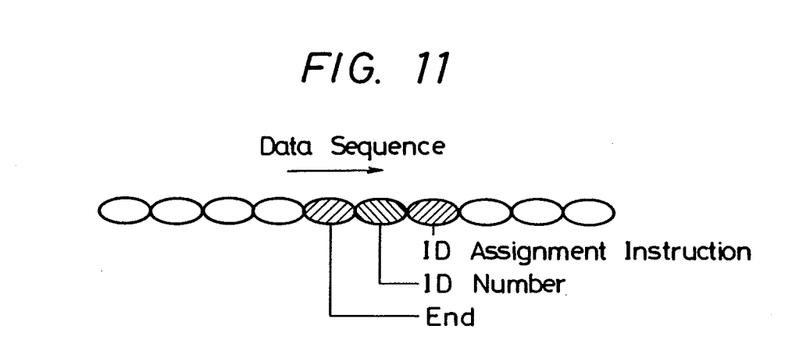

Next, a procedure of assigning an ID number to each of the decoders will be explained with reference to FIGS. 10 and 11. An assignment program is started at step 101. At step 102, the decoder 3A checks whether or not a data sequence for an ID number assignment as shown in FIG. 11 is transmitted from the controller 1. Next, it is judged at step 103 whether or not information transmitted from the controller 1 is a data sequence for ID number assignment. If the answer at step 103 is no, the program proceeds to step 106 to be terminated. On the contrary, if the answer at step 103 is yes, the program proceeds to step 104 whereat the decoder 3A stores therein an ID number included in the data sequence as its own ID number and is set at its initial value.

Next, at step 105, the decoder 3A increments its own ID number by 1 and transmits from its AUX port the incremented ID number as the ID number assigned to the next decoder, i.e. the decoder 3B. Then, the program is terminated at step 106.

In the same manner as described above, the decoder 3B stores therein the ID number transmitted from the decoder 3A as its own ID number and is set at its initial value. Then, the decoder 3B increments its own ID number by 1 and transmits from its AUX port the incremented ID number as the ID number assigned to the next decoder 3C. The same procedure is repeated for the decoders 3D to 3I, and thereby the assignment of the ID number to all the decoders 3A to 3I is completed.

Figure 12:
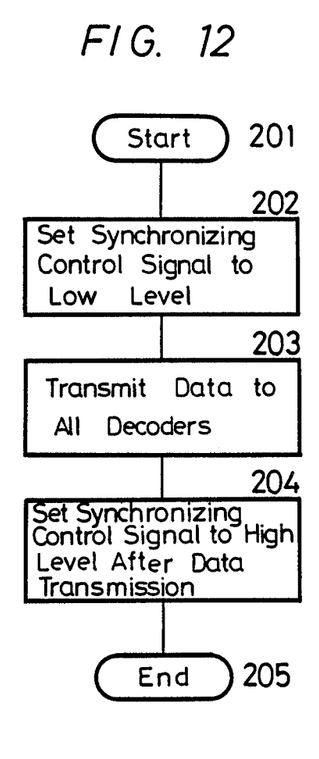
FIGS. 12 and 13 are flow charts used to explain how decoders are synchronously operated by an external control.
Figure 13:
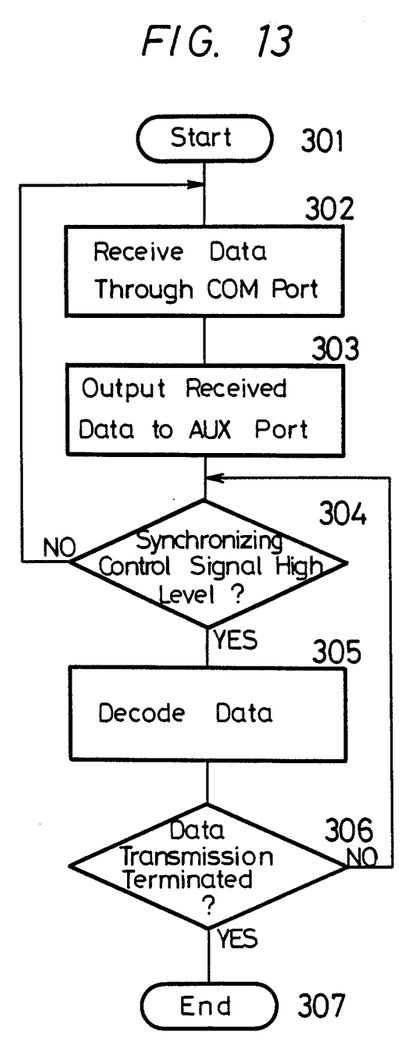

Next, the method of operating the decoders in synchronism with each other, that is, the method of simultaneously operating all the decoders 3A to 3I by the synchronizing control signal generated by the controller 1, will be explained with reference to FIGS. 12 and 13 respectively showing the operation of the controller 1 and that of the decoders 3A to 3I.

First, referring to FIG. 12, the operation of the controller 1 will be described in detail. The synchronization program for the controller 1 is started at step 201. The controller 1 sets the synchronizing control signal outputted from the I/O interface 15 at one of the two levels, e.g. Low level at step 202. Next, at step 203, the controller 1 transmits all data to the decoders 3A to 3I. Then, at step 204, the controller 1 sets the synchronizing control signal outputted from the I/O interface 15 at the other level, e.g. High level after all the data are completely transmitted to the decoders. The program is terminated at step 205.

Now, the operation of the decoders 3A to 3I is explained with reference to FIG. 13. The synchronization program for all the decoders 3A to 3I is started at step 301. Then, each decoder receives data through its COM port at step 302 and delivers the received data through its AUX port at step 303. It is judged at step 304 whether or not the synchronizing control signal supplied from the I/O interface 15 of the controller 1 to the I/O interface 25 of each of the decoders is at High level. If the answer at step 304 is no, that is, the synchronizing control signal is not in High level, the program returns to step 302. On the other hand, if the answer is yes, that is, if the synchronizing control signal is at High level, the program proceeds to step 305 whereat the received data is decoded by each decoder. Next, at step 306, it is judged whether or not the data transmission is terminated. If the answer is no, the program returns to step 304. On the contrary, if the answer is yes, the program proceeds to step 307 to be terminated.

It can therefore be noted that the decoders 3A to 3I receive data but do not decode them while the synchronizing control signal is at Low level and that when the synchronizing control signal becomes High level, all the decoders 3A to 3I start at the same time the decoding of the data received.

Figure 14:
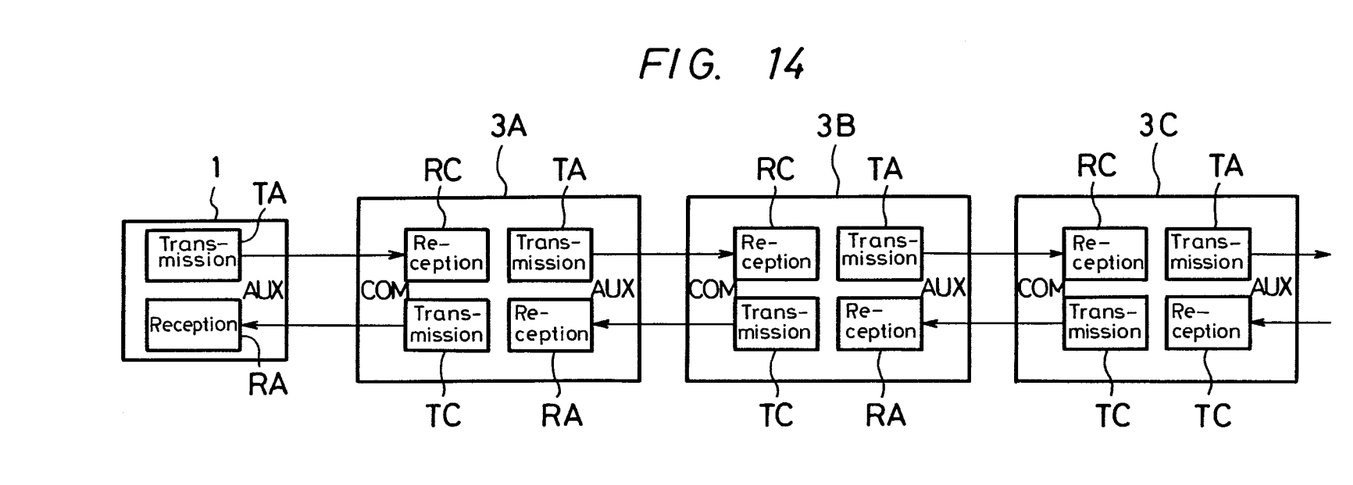
FIGS. 14 and 15 are respectively a diagram and a flow chart used for explaining how a flow control is effected.

When data overflow is detected by one of serially connected decoders, the decoder commands the preceding decoder to stop the outputting of the data. The procedure of this function or flow control will now be explained with reference to FIGS. 14 and 15. Referring first to FIG. 14, the controller 1 is provided with a buffer TC for data transmission and a buffer TR for data reception for the COM port and a buffer TA for data transmission and a buffer RA for data reception for the AUX port. The buffers TC, TR, TA, and RA are allocated on the work RAM 12, and only the transmission buffer TA and the reception buffer RA for the AUX port appear in FIG. 14. In the same manner, each decoder is provided with a transmission buffer TC and a reception buffer RC for the COM port and a transmission buffer TA and a reception buffer RA for the AUX port, all of which are allocated on the work RAM 22. The data in the transmission buffer TA for the AUX port of the controller 1 is transmitted to the reception buffer RC for the COM port of the decoder 3A. The data in the transmission buffer TC for the COM port of the decoder 3A is transmitted to the reception buffer RA for the AUX port of the controller 1. Namely, the data are bi-directionally transmitted between the controller 1 and the decoder 3A. In the same manner, the data in the transmission port TA for the AUX port of the decoder 3A is transmitted to the reception buffer RC for the COM port of the decoder 3B, and the data in the transmission buffer TC for the COM port of the decoder 3B is transmitted to the reception buffer RA for the AUX port of the decoder 3A, that is, the bi-directional transmission of the data is effected also between the decoders 3A and 3B. The other decoders are constructed such that the bi-directional data transmission can be effected between respective adjacent decoders.

Figure 15:
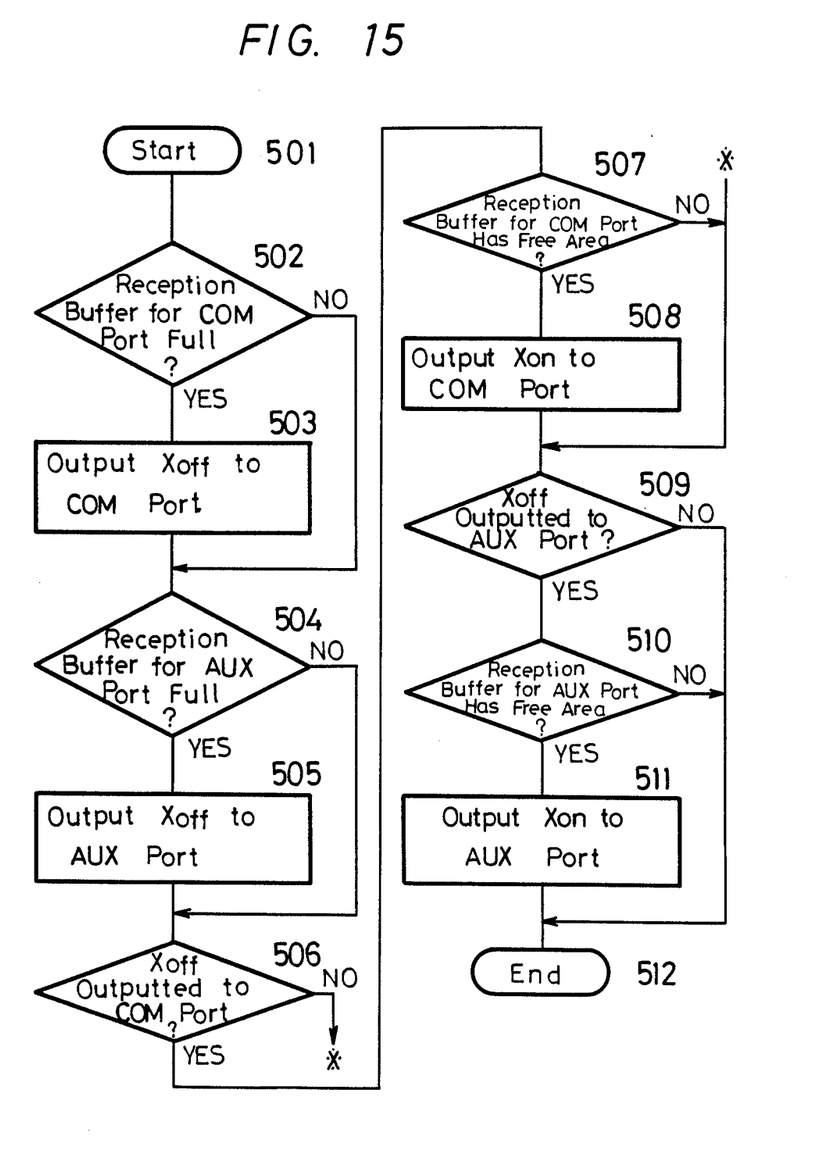

In the construction described as above, an operation among the decoders 3A-3C will be explained, as an example, with reference to the flow chart of FIG. 15.

First, a transmission program is started at step 501. Next, it is judged at step 502 whether or not the reception buffer RC for the COM port of the decoder 3B is full, that is, whether or not the reception buffer RC is overflowed with transmitted data. If the answer is yes at step 502, the program proceeds to step 503 whereat a transmission stop signal $X_{off}$ is outputted to the transmission buffer TC for the COM port of the decoder 3B. The transmission stop signal $X_{off}$ is then received by the reception buffer RA for the AUX port of the preceding decoder 3A, so that the decoder 3A stops the transmitting of the data to the decoder 3B. If the answer at step 502 is no, that is the reception buffer RC of the decoder 3B is not full, the program jumps to step 504. Then, it is judged at step 504 whether or not the reception buffer RA for the AUX port of the decoder 3B is full. If the answer is yes, the program proceeds to step 505 whereat a transmission stop signal $X_{off}$ is outputted to the transmission buffer TA for the AUX port of the decoder 3B. The signal $X_{off}$ is then transmitted to the transmission buffer RC for the COM port of the next decoder 3C, whereby the decoder 3C stops the transmitting of the data to the decoder 3B. If the answer at the step 504 is no, that is, if the buffer RA is not full, the program jumps to step 506.

At step 506, it is judged whether or not the transmission stop signal $x_{off}$ is outputted to the transmission buffer TC for the COM port of the decoder 3B. If the answer is yes, the program proceeds to step 507 whereat it is judged whether or not the transmission buffer RC for the COM port of the decoder 3B has a free or vacant area. If the answer at step 507 is yes, that is, if the transmission buffer RC has a vacant area, the transmission buffer TC for the COM port of the decoder 3B is supplied with a transmission resuming signal $X_{on}$ at step 508. The signal $X_{on}$ is then received by the reception buffer RA for the AUX port of the preceding decoder 3A, and thereby the decoder 3A resumes the data transmission to the decoder 3B. If the answer at step 506 or 507 is no, that is, if the transmission signal $X_{off}$ is not outputted or if the reception buffer RC does not have free area, the program jumps to step 509.

Next, it is judged at step 509 whether or not the transmission stop signal $X_{off}$ is outputted to the transmission buffer TA for the AUX port of the decoder 3B. If the answer is yes, the program proceeds to step 510 whereat it is judged whether or not the reception buffer RA for the AUX port of the decoder 3B has free area. If the answer at step 510 is yes, the transmission resuming signal $X_{on}$ is outputted to the transmission buffer TA for the AUX port of the decoder 3B at step 511. The signal $X_{on}$ is then received by the reception buffer RC for the COM port of the next decoder 3C, whereby the decoder 3C resumes the data transmission to the decoder 3B. Now, the program proceeds to step 512 to be terminated. If the answer at step 509 or 510 is no, that is, if the transmission stop signal $X_{off}$ is not outputted or if the reception buffer RA does not have free area, the program jumps to step 512 to be terminated.

The above described operation can be similarly carried out between the controller 1 and the decoder 3A as well as between respective two adjacent decoders.

As described above, according to the present invention, the identification number is inserted in a predetermined portion of the data sequence generated by the information generating means, and the first terminal of a plurality of serially connected terminals is set at the initial value by the identification number supplied from the information generating means and produces and transmits a new identification number for the terminal at the next stage, so that each of a plurality of the serially connected terminals can be set at its initial value by the assigned identification number through substantially one transmission line, whereby the circuit construction of the system can be simplified. Also, it is not necessary to provide the information generating means with transmission ports for every terminal but only one transmission port for the first terminal, so that it is possible to simplify the circuit configuration of the information generating means.

The above description is given on a single preferred embodiment of the invention but it will be apparent that many modifications and variations could be effected by one skilled in the art without departing from the spirit or scope of the novel concepts of the invention so that the scope of the invention should be determined by the appended claims only.

We claim as our invention:

1. A multiple display system for displaying data derived internally or externally on a display formed of a plurality of display devices as a single picture screen, said multiple display system comprising:
   encoder means responsive to said data for generating a coded data signal;
   a plurality of decoding means connected to said encoder means and arranged in a series from a first decoding means to a last decoding means; and
   a plurality of display devices respectively corresponding to said decoding means and arranged in an array forming a single picture screen, said display devices being connected respectively to corresponding ones of said plurality of decoding means for displaying respective video signals fed thereto; wherein:
   said encoder means comprises means for inserting an identification number in a predetermined portion of said coded data signal and for transmitting said coded data signal to the first decoding means in said series;
   each decoding means except the last in said series comprises means for transmitting said coded a data signal to the next decoding means in said series;
   each of said decoding means comprises means for adopting the identification number transmitted to it in said coded data signal as its own;
   each decoding means except the last in said series comprises means for deriving a new identification number from the identification number transmitted to it and for substituting said new identification number into said coded data signal for transmission to the next decoding means in said series; and
   said plurality of decoding means respectively comprise means for extracting data with corresponding identification numbers from said data sequence supplied thereto, for converting the extracted data into decoded video signals, and for supplying said display devices with said decoded video signals.

2. A multiple display system according to claim 1, in which said encoder means supplies said plurality of decoding means with a synchronizing control signal, whereby said plurality of decoding means are synchronized with one another to display a plurality of images in synchronism.

3. A multiple display system according to claim 2, in which each of said plurality of decoding means is normally capable of outputting of data and includes means for detecting a data overflow condition therein and generating a transmission stop signal fed to a next preceding decoding means for preventing said outputting of data.

4. A multiple display system according to claim 2, in which said coded data signal identified said display data by coordinates information and said encoder means further includes means for converting coordinates information of said display data into predetermined enlarged coordinates information for each of said plurality of decoding means, encodes said enlarged coordinates information, and supplies said encoded enlarged coordinates information to said plurality of decoding means, respectively, to thereby effect an enlarged display by the use of said respective display devices corresponding to said decoding means.

5. A multiple display system according to claim 4, in which said encoder means calculates certain position coordinates defining a given position and on the basis of said position coordinates calculates enlarged coordinates for each of said plurality of decoder means, said enlarged coordinates defining, for each of said plurality of decoder means, a position which is displaced from said given position in a predetermined direction by a predetermined amount on screens of said plurality of said display devices respectively corresponding to said plurality of decoding means.

* * * * *

UNITED STATES PATENT AND TRADEMARK OFFICE
CERTIFICATE OF CORRECTION

PATENT NO. : 4,800,376
DATED : January 24, 1989
INVENTOR(S) : Ryoichi Suga et al.

It is certified that error appears in the above-identified patent and that said Letters Patent is hereby corrected as shown below:

Column 6, line 10, after "information" delete ":"

IN CLAIMS
Column 11, line 51, delete "a".

Signed and Sealed this

Twenty-fifth Day of July, 1989

Attest:

DONALD J. QUIGG

Attesting Officer    Commissioner of Patents and Trademarks